3,314,336
BALL AND SOCKET JOINT FOR CYLINDER HEAD
Bernard Jorgji, Hamburg-Lokstedt, Germany, assignor to Licentia Patent-Verwaltungs, G.m.b.H., Frankfurt am Main, Germany
Filed May 19, 1964, Ser. No. 368,603
Claims priority, application Germany, May 20, 1963, L 44,923
2 Claims. (Cl. 92—118)

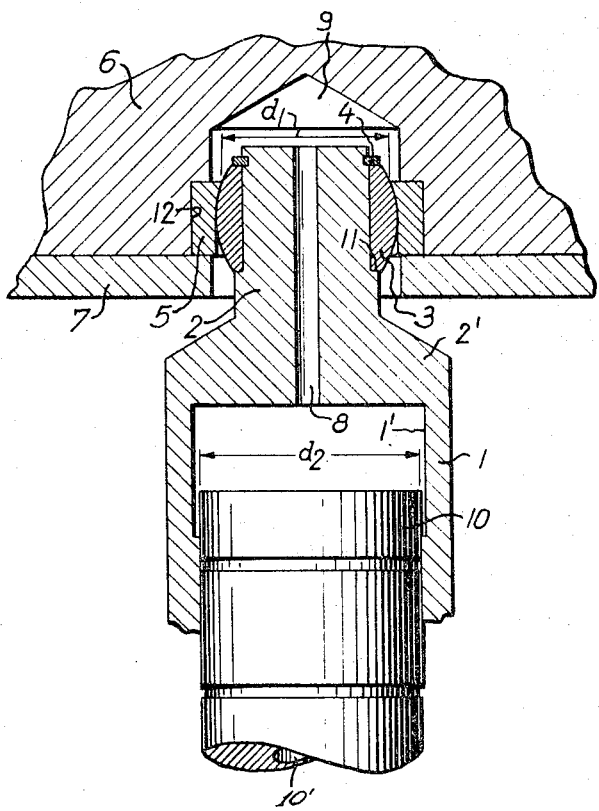

The present invention relates generally to mechanical joints, and, more particularly, to a ball and socket joint for connecting a cylinder head with its support body. Such connections are used mostly in piston or reciprocating engines which have cylinders which swing or pendulate in operation universally in all directions about their cylinder head support.

Ball and socket joints for such purposes have already been proposed in which a ball or sphere is provided at the bottom of the cylinder and is embedded in the support body. Also, it has been proposed to fashion the bottom of the cylinder proper as a ball joint of the ball socket type, or to provide the cylinder with a calotte-shaped or hemispherically shaped bottom which is then centered and pressed into a calotte-shaped bearing which conforms to it and which is provided in the support body. This is done by means of an elastic or yieldable cylinder shell which is pretensioned with respect to the support body.

It is the main object of the present invention to provide a ball and socket joint for a cylinder head which requires substantially less technical expenditure for its manufacture than previous arrangements.

Another object of the present invention is to provide a ball and socket joint for connecting a cylinder head with its support body and which can be assembled relatively easily using standard machine tools.

A further object of the present invention is to provide a device of the character described which can be easily mounted in a satisfactory manner.

Still another object of the present invention is to provide a device of the character described which permits the provision of a hydraulic bearing pressure relief arrangement.

These objects and others ancillary thereto are accomplished in accordance with preferred embodiments of the invention wherein the cylinder head is provided with an axial pivot pin for support purposes. The inner ring or collar of a ball and socket joint bearing is provided on this pin and the outer ring thereof is fixedly mounted in a recess of the support body. The inner ring of the joint may be fixedly provided at the front end between a shoulder of the axial pivot pin and a retainer or snap ring so that it can not be displaced.

A special embodiment of the invention for the ball and socket joint for a cylinder having a bore through the head thereof for use in hydraulic axial piston machines is an arrangement whereby the end face of the inner ring of the ball and socket joint, which is under hydraulic pressure, is related to the pressure effective end face of the piston of the cylinder so that the degree of force with which the inner and outer rings of the ball and socket joint press against each other is that which is required for sealing against the escape of pressure fluid.

Additional objects and advantages of the present invention will become apparent upon consideration of the following description when taken in conjunction with the accompanying drawing in which the sole figure is a diagrammatic cross-sectional view illustrating a ball and socket joint of the head of a cylinder connected with a cylinder support in a hydraulic axial piston machine.

With more particular reference to the drawing, there is shown a portion of a unit which may constitute one of the piston-cylinder assemblies of the type shown in U.S. Patent No. 2,146,133, issued to Ralph L. Tweedale on Feb. 7th, 1939. As shown in the drawing, the cylinder head 1 is provided at one end with an internal cylinder chamber 1'. The cylinder head then forms a transition portion 2' and is formed at the other end into an axial pivot pin 2. The inner ring 3 of a ball and socket joint bearing is provided on the axial pivot pin 2 and this ring is externally spherically shaped and provided on a shoulder 11 of the pivot pin 2. This inner ring is secured against longitudinal displacement by the retainer ring 4 at one end and the shoulder 11 on the pivot pin 2 on the other end. The outer ring 5 of the joint has its interior spherically shaped and is disposed in a bore or recess 12 of the cylinder support 6 and is secured against longitudinal displacement by means of a plate 7 which is fixedly connected with the cylinder support 6. The inner ball and socket joint member 3 can be considered to be the ball while the outer member 5 can be considered as the socket.

In order to provide hydraulic bearing pressure relief, the cylinder head 1 is provided with a bore 8 which extends through the pivot pin 2 and communicates the interior cylinder chamber 1' with the hollow space 9 formed in cylinder support 6. This hollow space 9 is disposed above the ball and socket joint. The passage of fluid into and out of the cylinder chamber 1' takes place through an axial bore 10' provided in the cylinder piston 10. The diameter $d_1$ of the inner surface of the outer ring or socket 5 is so chosen with respect to the diameter $d_2$ of the cylinder piston 10, that the ball and socket joint is extensively relieved from the hydraulic pressures produced at the bottom of the cylinder by the action of piston 10 on the fluid within chamber 1' and is merely exposed to a force differential which is just sufficient to ensure that there is a surface pressure between the engaging or touching surfaces of the inner ring and outer ring of the ball and socket joint which is necessary for sealing off the pressure fluid. More specifically, these diameters are so chosen that the effective force applied to the end face of chamber 1' by the pressure exerted by piston 10 on the fluid in this chamber is always somewhat greater than the force exerted on inner ring 3 and the end of pin 2 by the fluid in hollow space 9. In this connection, it should be noted that any force exerted on these elements by the ambient pressure outside cylinder 1 is substantially smaller than the above-described force differential. This surface pressure is always disposed far below the value of the critical load of the ball and socket joint.

This ball and socket joint connection in accordance with the present invention is particularly advantageous in that except for the ball and socket joint bearings which is of commercially available construction, it can be manufactured exclusively by working processes on lathes and drills.

It will be understood that the above description of the present invention is susceptible to various modifications, changes, and adaptations, and the same are intended to be comprehended within the meaning and range of equivalents of the appended claims.

What is claimed is:

1. A ball and socket joint device for connecting a cylinder head with a support body, comprising, in combination:
   a cylinder head having an axial pivot pin provided with a bore therethrough one end of which communicates with the cylinder chamber of said cylinder head;

an inner ring of a ball and socket joint seated on said pivot pin;

a support body having a recess and a space disposed behind said recess;

means for supplying fluid to said cylinder chamber; and an outer ring of a ball and socket joint bearing fixedly mounted in said recess and receiving said inner ring so that the other end of said bore communicates with said space;

the dimensions of said inner ring, said pivot pin, and said cylinder chamber being such that the force applied to the end face of said chamber by fluid therein is always slightly greater than the force applied by the fluid in said space to the end of said pivot pin and to the portion of said inner ring disposed in said space for creating a sealing pressure between said inner ring and said outer ring which is sufficient to prevent the passage of fluid between said rings.

2. A device for connecting a cylinder head with a support body, comprising, in combination:

a cylinder head having a cylinder chamber at one end and a pivot pin at the other end having a retainer ring near its end, a shoulder spaced from said retainer ring, and a bore therethrough in connection with said cylinder chamber;

a piston in said cylinder chamber;

a cylinder support body having a chamber with a recess forming a shoulder disposed near the outer portion of the chamber; and ball and socket means connecting the end of said pivot pin in said body chamber for universal pivoting movement and including a ball-like inner ring fixed on said pivot pin between said pin shoulder and said retainer ring, and an outer ring having an interior surface conforming to said ball-like inner ring fixed in said recess and receiving said inner ring for universal pivoting movement;

the outer diameter of said inner ring being smaller than the diameter of said piston and the dimensions of said inner ring, said pivot pin, and said cylinder chamber being such that the force applied to the end face of said cylinder chamber by a pressure medium therein is always slightly greater than the force applied by the pressure medium in the body chamber to the end of said pivot pin and to the portion of said inner ring disposed in said body chamber for creating a sealing pressure between said inner ring and said outer ring which is sufficient to prevent the passage of fluid between said rings.

References Cited by the Examiner
UNITED STATES PATENTS

| | | | |
|---|---|---|---|
| 398,143 | 2/1889 | Gale | 91—176 |
| 1,635,468 | 7/1927 | Dodge | 308—72 |
| 1,770,721 | 7/1930 | Willis | 287—87 X |
| 2,146,133 | 2/1939 | Tweedale | 103—162 |
| 3,152,522 | 10/1964 | Burden et al. | 92—119 X |
| 3,165,942 | 1/1965 | Steiner et al. | 287—21 X |
| 3,202,062 | 8/1965 | Burden | 92—119 X |

FOREIGN PATENTS 616,390  1/1949  Great Britain.

MARTIN P. SCHWADRON, Primary Examiner.
SAMUEL LEVINE, EDGAR W. GEOGHEGAN, Examiners.
I. C. COHEN, Assistant Examiner.